United States Patent
Yasuda et al.

(10) Patent No.: US 12,034,280 B2
(45) Date of Patent: Jul. 9, 2024

(54) PLANT MODULE, PLANT INCLUDING THE SAME, AND OPERATION METHOD OF PLANT

(71) Applicant: Chiyoda Corporation, Yokohama (JP)

(72) Inventors: Satoshi Yasuda, Yokohama (JP); Tomoyuki Konda, Yokohama (JP)

(73) Assignee: CHIYODA CORPORATION, Kanagawa (JP)

( * ) Notice: Subject to any disclaimer, the term of this patent is extended or adjusted under 35 U.S.C. 154(b) by 207 days.

(21) Appl. No.: 17/775,338

(22) PCT Filed: Nov. 13, 2019

(86) PCT No.: PCT/JP2019/044479
§ 371 (c)(1),
(2) Date: May 9, 2022

(87) PCT Pub. No.: WO2021/095150
PCT Pub. Date: May 20, 2021

(65) Prior Publication Data
US 2022/0393443 A1    Dec. 8, 2022

(51) Int. Cl.
H02B 1/56    (2006.01)
H02B 5/00    (2006.01)

(52) U.S. Cl.
CPC ............ *H02B 1/56* (2013.01); *H02B 5/00* (2013.01)

(58) Field of Classification Search
CPC ................................ H02B 1/56; H02B 5/00
See application file for complete search history.

(56) References Cited

U.S. PATENT DOCUMENTS 5,258,652 A * 11/1993 Nigawara ......... H02J 13/00019
307/17
6,590,769 B2 * 7/2003 Hilpert ............... H05K 5/0212
174/15.1
(Continued)

FOREIGN PATENT DOCUMENTS

EP    3570393 A1    11/2019
JP    108168118 A    6/1996
(Continued)

OTHER PUBLICATIONS

International Search Report for Patent Application PCT/JP2019/044479 mailed Feb. 10, 2020; 2 pp.

*Primary Examiner* — Robert J Hoffberg
(74) *Attorney, Agent, or Firm* — Armstrong Teasdale LLP

(57) ABSTRACT

To safely start and operate electrical devices accommodated in a local electrical room located in a hazardous area, a plant module (2) includes: a group of plant equipment (6) that constitutes a plant; a local electrical room (5) located in a hazardous area (31) defined by presence of combustible gas and accommodating a power device configured to supply electric power to the group of plant equipment (6); a structure (21) supporting the group of plant equipment (6) and the local electrical room (5); and an outside air supply device (64) having explosion-proof properties and arranged at the local electrical room (5) to supply outside air to an inside thereof, wherein the plant module (2) is configured to supply the electric power to the outside air supply device (64) from a non-hazardous area.

10 Claims, 6 Drawing Sheets

(56) References Cited

U.S. PATENT DOCUMENTS

| | | | | |
|---|---|---|---|---|
| 7,684,167 B2* | 3/2010 | Burr | .................. | H02H 9/008 |
| | | | | 361/119 |
| 8,136,540 B2* | 3/2012 | Hays | .................. | B08B 3/02 |
| | | | | 134/155 |
| 8,652,265 B2* | 2/2014 | Hays | .................. | B08B 3/10 |
| | | | | 165/95 |
| 8,692,648 B2* | 4/2014 | Dantas | ............... | B66F 7/065 |
| | | | | 340/3.3 |
| 9,032,979 B2* | 5/2015 | Hays | .................. | B08B 3/02 |
| | | | | 134/155 |
| 10,574,035 B2* | 2/2020 | Bailey | ............... | H02G 3/081 |
| 2009/0045925 A1* | 2/2009 | Demin | ............ | B67D 7/3236 |
| | | | | 340/12.32 |
| 2015/0352655 A1* | 12/2015 | Watters | ............ | G05D 16/20 |
| | | | | 700/282 |
| 2020/0261901 A1* | 8/2020 | Mossig | ............... | B01L 1/04 |
| 2020/0300540 A1 | 9/2020 | Kagawa et al. | | |

FOREIGN PATENT DOCUMENTS

| | | | |
|---|---|---|---|
| JP | 2018113797 A | 7/2018 | |
| JP | 2019193362 A | 10/2019 | |
| WO | 2019008725 A1 | 1/2019 | |

\* cited by examiner

PLANT MODULE, PLANT INCLUDING THE SAME, AND OPERATION METHOD OF PLANT

CROSS-REFERENCE TO RELATED APPLICATION

This application is a U.S. National Phase Application of PCT/JP2019/044479 filed Nov. 13, 2019, which is hereby expressly incorporated by reference in its entirety.

TECHNICAL FIELD

The present invention relates to a plant module having a group of devices used in a plant, a plant including the plant module, and an operation method of the plant.

BACKGROUND ART

Conventionally, for example, when a liquefaction plant (hereinafter referred to as "LNG plant") for natural gas is constructed, necessary facilities such as an acidic gas removing facility, a moisture removing facility, and a compression facility are assembled at a construction site. The acidic gas removing facility is a facility that removes acidic gas contained in raw material gas to be liquefied. The moisture removing facility is a facility that removes moisture contained in the raw material gas. The compression facility is a facility that compresses a refrigerant used for cooling and liquefying the raw material gas.

On the other hand, a technique for improving work efficiency at such a construction site is spread. In this technique, the facilities composing such an LNG plant and the apparatus, devices, and the like included in these facilities are assembled in advance in a remote place as a plurality of modularized facilities (hereinafter simply referred to as "module(s)") and then those modules are transported to the construction site.

Further, a known module includes a frame that constitutes the module and a building that accommodates at least one of a power supply device configured to supply electric power to a power consuming device and a control information output device configured to output information on operation control of a controlled device (for example, see FIG. 4 of Patent Document 1).

PRIOR ART DOCUMENT(S)

Patent Document(s)

Patent Document 1: WO2019/008725A1

SUMMARY OF THE INVENTION

Task to be Accomplished by the Invention

By the way, a hazardous area is set in a plant that handles combustible gas. The hazardous area is an area where precautions against an explosion are required for each device used therein. An area where the module constituting the plant is located may be set as the hazardous area.

Accordingly, in the conventional module disclosed in Patent Document 1, all the electrical devices and control devices, which are accommodated in the building in the hazardous area and may be an ignition source, need to have explosion-proof properties. As a result, the cost for the facilities in the plant may unfavorably increase.

In view of the above problem of the prior art, a primary object of the present invention is to provide a plant module that includes a local electrical room located in a hazardous area and can safely start and operate devices without explosion-proof properties even if these devices are located in the local electrical room. Also, a primary object of the present invention is to provide a plant including the plant module and an operation method of the plant.

Means to Accomplish the Task

The first aspect of the present invention provides an operation method of a plant (1) including a plant module (2), the plant module comprising: a group of plant equipment (6) that constitutes the plant; a local electrical room (5) located in a hazardous area (31) defined by presence of combustible gas, the local electrical room having a power device configured to supply electric power to the group of plant equipment; a structure (21) supporting the group of plant equipment and the local electrical room; and an outside air supply device (64) having explosion-proof properties and arranged at the local electrical room to supply outside air to an inside thereof, the operation method of the plant comprising supplying the electric power to the outside air supply device from a non-hazardous area.

According to this aspect, it is possible to safely start and operate the devices by supplying the outside air to the local electrical room and purging combustible gas or explosive gas therefrom.

The second aspect of the present invention provides an operation method of a plant (1) including a plant module (2), the plant module comprising: a group of plant equipment (6) that constitutes the plant; a local control room (105) located in a hazardous area defined by presence of combustible gas, the local control room having a control device configured to transmit a control signal to the group of plant equipment; a structure (21) supporting the group of plant equipment and the local control room; and an outside air supply device (64) having explosion-proof properties and configured to supply outside air to an inside of the local control room, the operation method of the plant comprising supplying electric power to the outside air supply device from a non-hazardous area.

According to this aspect, it is possible to safely start and operate the devices by supplying the outside air to the local control room and purging combustible gas or explosive gas therefrom.

According to the third aspect of the present invention, the operation method further comprises: after starting to supply the electric power to the outside air supply device, replacing gas inside the local electrical room with the outside air by the outside air supply device; and starting to supply the electric power to at least one device included in the group of plant equipment.

According to this aspect, it is possible to safely start and operate the device included in the group of plant equipment by a simple procedure.

The fourth aspect of the present invention provides a plant module (2) comprising: a group of plant equipment (6) that constitutes a plant (1); a local electrical room (5) located in a hazardous area (31) defined by presence of combustible gas, the local electrical room having a power device configured to supply electric power to the group of plant equipment; a structure (21) supporting the group of plant equipment and the local electrical room; an outside air supply device (64) having explosion-proof properties and arranged at the local electrical room to supply outside air to an inside thereof; and a power cable (C14, C15) configured to supply the electric power to the outside air supply device from a non-hazardous area.

According to this aspect, it is possible to safely start and operate the devices by supplying the outside air to the local electrical room from outside the hazardous area and purging combustible gas or explosive gas therefrom.

The fifth aspect of the present invention provides a plant module (2) comprising: a group of plant equipment (106) that constitutes a plant (1); a local control room (105) located in a hazardous area (31) defined by presence of combustible gas, the local control room having a control device configured to transmit a control signal to the group of plant equipment; a structure (21) supporting the group of plant equipment and the local control room; an outside air supply device (64) having explosion-proof properties and arranged at the local control room to supply outside air to an inside thereof; and a power cable (C14, C15) configured to supply electric power to the outside air supply device from a non-hazardous area.

According to this aspect, it is possible to safely start and operate the devices by supplying the outside air to the local control room from outside the hazardous area and purging combustible gas or explosive gas therefrom.

According to the sixth aspect of the present invention, the outside air supply device includes an air intake pipe (71) configured to supply the outside air to the inside of the local electrical room, and the air intake pipe includes an outside air inlet (71A) located outside the hazardous area.

According to this aspect, by using a simple configuration, the plant module can reliably supply the outside air to the local electrical room from outside the hazardous area.

According to the seventh aspect of the present invention, the outside air supply device is configured to supply the outside air to the inside of the local electrical room so as to set the inside of the local electrical room at positive pressure.

According to this aspect, by using a simple configuration, the plant module can prevent gas around the local electrical room (gas that may contain combustible gas) from entering the local electrical room, and thus stably operate the devices that may become an ignition source.

The eighth aspect of the present invention provides a plant (1) comprising a plant module (2), wherein the plant module includes: a group of plant equipment (6) that constitutes a plant; a local electrical room (5) located in a hazardous area (31) defined by presence of combustible gas, the local electrical room having a power device configured to supply electric power to the group of plant equipment; a structure (21) supporting the group of plant equipment and the local electrical room; an outside air supply device (64) having explosion-proof properties and arranged at the local electrical room to supply outside air to an inside thereof; and a power cable (C14, C15) configured to supply the electric power to the outside air supply device from a non-hazardous area.

According to this aspect, it is possible to safely start and operate the devices by supplying the outside air to the local electrical room from outside the hazardous area and purging combustible gas or explosive gas therefrom.

According to the ninth aspect of the present invention, the plant further comprises a main electrical room (3) located outside the hazardous area and having one or more out-of-area distribution boards (43, 44) configured to supply the electric power to the local electrical room, wherein the power cable connects at least one of the out-of-area distribution boards and the outside air supply device, and the out-of-area distribution boards include a normal distribution board (43) configured to distribute the electric power from a normal power supply and an emergency distribution board (44) configured to distribute the electric power from an emergency power supply.

According to this aspect, the plant can supply the electric power to the devices from the emergency power supply even if the normal power supply is lost.

According to the tenth aspect of the present invention, the plant further comprises: a switchboard (65) located in the local electrical room; an indoor distribution board (61) located in the local electrical room and configured to supply the electric power to the group of plant equipment; and a power supply device (47, 48) located in the main electrical room and configured to supply control electric power to the switchboard, wherein the switchboard is configured to supply the control electric power supplied from the power supply device to the indoor distribution board.

According to this aspect, even if a power outage occurs, the plant can supply the electric power, which is supplied from the power supply device, from the indoor distribution board to the devices.

According to the eleventh aspect of the present invention, each of the normal distribution board and the emergency distribution board includes a high voltage switchgear (41, 42) and a low voltage switchgear (43, 44), and the plant module further includes: a first dry transformer located in the local electrical room and configured to transform high voltage power to low voltage power, the high voltage power transformed by the first dry transformer (62) being supplied from the high voltage switchgear as the normal distribution board to the power device, and a second dry transformer (63) located in the local electrical room and configured to transform high voltage power to low voltage power, the high voltage power transformed by the second dry transformer being supplied from the high voltage switchgear as the emergency distribution board to the power device.

According to this aspect, by using a simple configuration, the plant can stably supply the electric power from the emergency power supply as the low voltage power even if the normal power supply is lost.

According to the twelfth aspect of the present invention, the power cable is connected to each of the low voltage switchgear as the normal distribution board and the low voltage switchgear as the emergency distribution board.

According to this aspect, by using a simple configuration, the plant can safely start and operate the devices that are located in the local electrical room and may become an ignition source.

According to the thirteenth aspect of the present invention, the plant module further includes a high voltage electrical load (80) to which the high voltage power from the high voltage switchgear as the normal distribution board is supplied without passing through the power device.

According to this aspect, by using a simple configuration, the plant can safely supply the high voltage power to the high voltage electrical load of the plant module.

According to the fourteenth aspect of the present invention, the plant further comprises a generator (51) connected to the emergency distribution board.

According to this aspect, even if a power outage occurs, the plant can supply the electric power from the generator to the devices that require the electric power.

According to the fifteenth aspect of the present invention, the plant further comprises a local control room (105) having a control device configured to transmit a control signal to the group of plant equipment.

According to this aspect, even if the local control room of the plant module has the control device that may be an ignition source, the plant can safely start and operate the control device.

Effect of the Invention

Thus, according to the above aspects of the present invention, it is possible to safely start and operate devices without explosion-proof properties even if a local electrical room is located in a hazardous area and the above devices are accommodated in the local electrical room.

DETAILED DESCRIPTION OF THE INVENTION

In the following, an embodiment of the present invention will be described with reference to the drawings.

The First Embodiment

Figure 1:
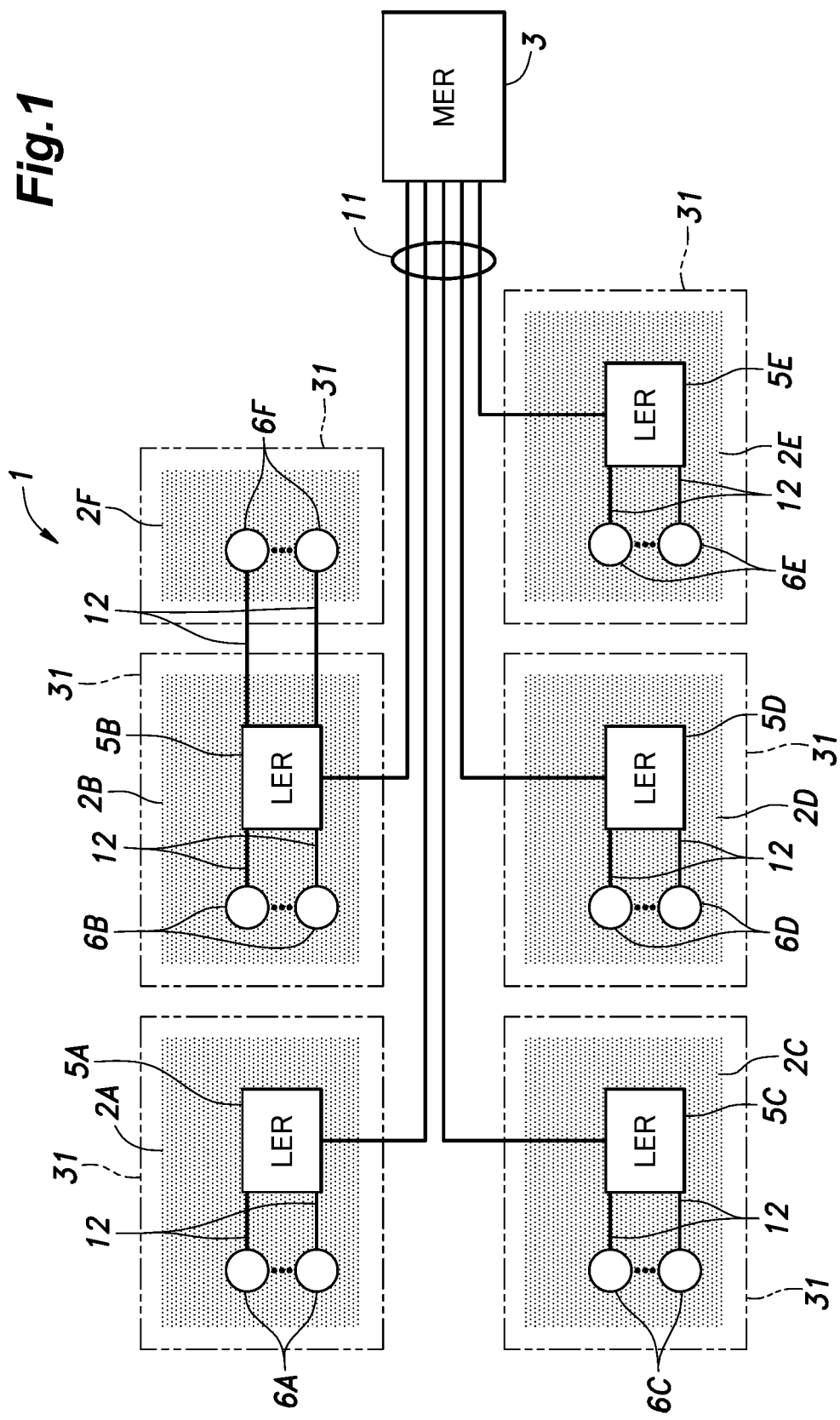
FIG. 1 is an overall block diagram showing an outline of an LNG plant according to the first embodiment.
Figure 2:
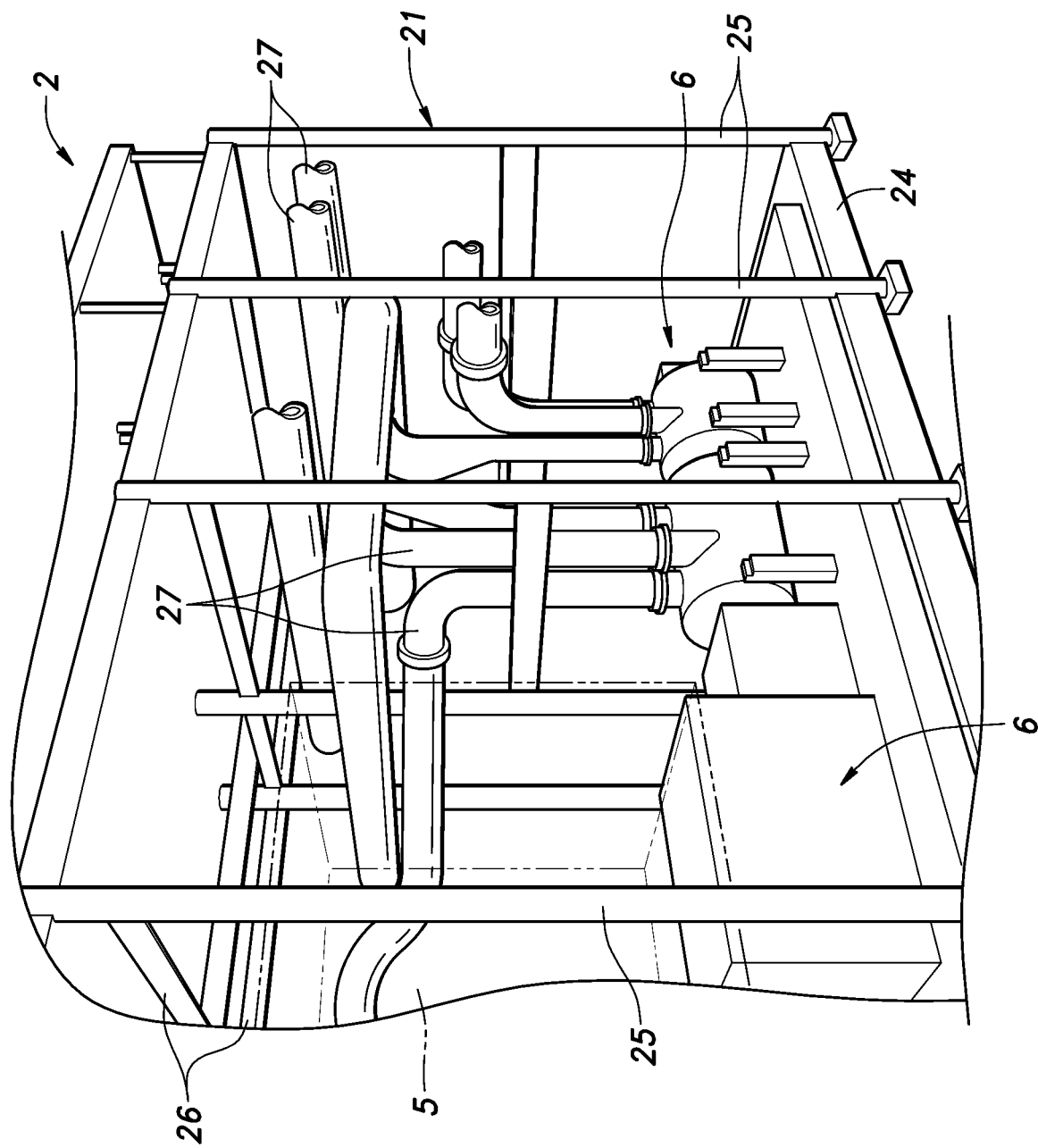
FIG. 2 is a schematic diagram showing the configuration of a module shown in FIG. 1.

FIG. 1 is an overall block diagram showing an outline of an LNG plant 1 according to the first embodiment. FIG. 2 is a schematic diagram showing the configuration of a module 2 shown in FIG. 1.

As shown in FIG. 1, the LNG plant 1 is a facility for generating LNG (liquefied natural gas) by performing a liquefaction process of natural gas taken out from gas fields or the like. The LNG plant 1 includes plural devices that constitute various facilities. In the LNG plant 1, the devices, pipes, and the like are appropriately combined and modularized, and thus installed as a plurality of modules (plant modules) 2A-2F. Further, the LNG plant 1 includes a main electrical room 3 (hereinafter referred to as "MER") that has a primary electrical device for supplying electric power (hereinafter simply referred to as "power") to each module 2.

Each module 2A-2F is assembled in advance in a remote place for reducing construction costs. After that, each module 2A-2F is transported to a construction site of the LNG plant 1 shown in FIG. 1. For example, the remote place is a country such as China and Southeast Asian country where each module 2A-2F can be assembled in advance at low cost and with a certain quality. After each module 2A-2F is installed, the pipes, cables (for example, primary power cables 11), or the like of the devices are connected to each other, and thus the modules 2A-2F constitute an LNG train as one continuous unit.

The various facilities used in the LNG plant 1 include, for example, an acidic gas removing facility, a moisture removing facility, a compression facility for a refrigerant, and a liquefaction process facility. As the refrigerant, a mixed refrigerant, a propane refrigerant, or the like is used. Each module 2A-2F is modularized per application and function. The acidic gas removing facility is a facility that removes acidic gas contained in raw material gas to be liquefied. The moisture removing facility is a facility that removes moisture contained in the raw material gas. The compression facility is a facility that compresses the refrigerant used for cooling and liquefying the raw material gas. The liquefaction process facility is a facility that liquefies the raw material gas by heat exchange between the raw material gas and the refrigerant.

Each module 2A-2E is provided with a local electrical room (hereinafter referred to as "LER") 5A-5E that has an auxiliary electrical device. The auxiliary electrical device is supplied with the power from the primary electrical device in the MER 3 via each primary power cable 11. Accordingly, each LER 5A-5E can supply the power to each group of plant equipment 6A-6E via each secondary power cable 12. Each group of plant equipment 6A-6E includes a plurality of power consuming devices that constitute each module 2A-2E in which the LER 5A-5E is located.

Incidentally, at least a portion of each secondary power cable 12 is installed in advance when each module 2A-2F is assembled in the remote place. Further, as each secondary power cable 12, a cable having a small diameter can be used as compared with a case where the LER 5A-5E is not located in each module 2A-2E and the cable is arranged directly from the MER 3 to each group of plant equipment 6A-6E. The distance from each LER 5A-5E to the corresponding group of plant equipment 6A-6E is shorter than the distance from the MER 3 to each group of plant equipment 6A-6E. Accordingly, a voltage drop is small, and thus the diameter of the cable can be made small. Thus, in the LNG plant 1, the cost of the power cables is reduced.

On the other hand, the module 2F is not provided with an LER. However, the power is supplied to the group of plant equipment 6F from the LER 5B of the module 2B adjacent to the module 2F. That is, in a case where the LER is not present in one module, an LER located in a module adjacent to the one module may supply the power to a group of plant equipment in the one module.

In the following, in a case where it is not necessary to distinguish each module 2A-2F by use or function, each module 2A-2F will be collectively referred to as "module 2". Further, in a case where it is not necessary to distinguish each LER 5A-5E, each LER 5A-5E will be collectively referred to as "LER 5". Furthermore, in a case where it is not necessary to distinguish each group of plant equipment 6A-6F, each group of plant equipment 6A-6F will be collectively referred to as "group of plant equipment 6".

As shown in FIG. 2, the module 2 includes the LER 5, a group of plant equipment 6, and a structure 21 supporting the LER 5 and the group of plant equipment 6. Incidentally, like the module 2F, the power may be supplied to the LER 5 from an adjacent module 2.

The LER 5 is formed in a building having a substantially cubic outer shape, and is a closed space defined by an upper wall, a side wall, and a bottom wall.

The group of plant equipment 6 includes a motor or the like driven by the power with relatively high voltage (for example, 6 kV) or the power with relatively low voltage (for example, 400V). For example, such a motor is used for a pump, a compressor, an air-cooling fan, and the like. For example, the motor driven by high voltage power is a motor used for a large-capacity compressor or the like. On the other hand, the motor driven by the low voltage power is a motor used for a pump configured to transport the LNG or the refrigerant.

The structure 21 is a support structure including a metal base 24, pillars 25, and beams 26. The pillars 25 and the beams 26 are made of a plurality of steel frames provided on the base 24. Further, in the module 2, not only the LER 5 and the group of plant equipment 6 but also pipes 27 for the LNG and the refrigerant, various cables (power cables, signal cables, or the like), containers (not shown), or the like are supported by the structure 21.

The structure 21 may be provided with a plurality of floors. In the embodiment, the LER 5 and the group of plant equipment 6 are arranged on the base 24, which is the lowest floor of the structure 21. The present invention is not limited to this embodiment, and the LER 5 and the group of plant equipment 6 may be arranged on any floor. By arranging the LER 5 and the group of plant equipment 6 on a plurality of floors, the installation area of the module 2 can be reduced.

With reference to FIG. 1, in the LNG plant 1, combustible gas such as natural gas or propane for the refrigerant flows through the devices and pipes provided in each module 2. Accordingly, an area within a prescribed distance from a group of plant equipment 6 that processes the combustible gas inside each module 2 is set to a hazardous area 31. In the present embodiment, the entire area of each module 2 and the circumferential area thereof are set to the hazardous area 31, for example. In the module 2 provided with the plurality of floors, the hazardous area 31 is set as a three-dimensional space.

In the present embodiment, "hazardous area" is an area where the combustible gas is present or expected to be present and thus precautions (for example, a treatment for providing the apparatus and devices with explosion-proof properties) against an explosion are required for the construction, installation, and use of the apparatus and devices. Such a hazardous area and its precautions are usually prescribed by the law of a country or region where the plant that handles the combustible gas is constructed, international standards, or the like.

Hereinafter, an area separated from the hazardous area 31 by a prescribed distance or more will be referred to as "non-hazardous area". The non-hazardous area is an area where the combustible gas is not present in such an amount that the precautions against an explosion are required for the construction, installation, and use of the apparatus and devices.

In the present embodiment, the present invention is applied to the LNG plant, for example. However, the present invention is not limited to this embodiment, and can be applied to any plant that handles the combustible gas. For example, the present invention may also be applied to an LNG gasification plant that gasifies the LNG, an oil refining plant, a petrochemical plant that manufactures chemical products such as ethylene and propylene, and a general chemical plant.

Figure 3:
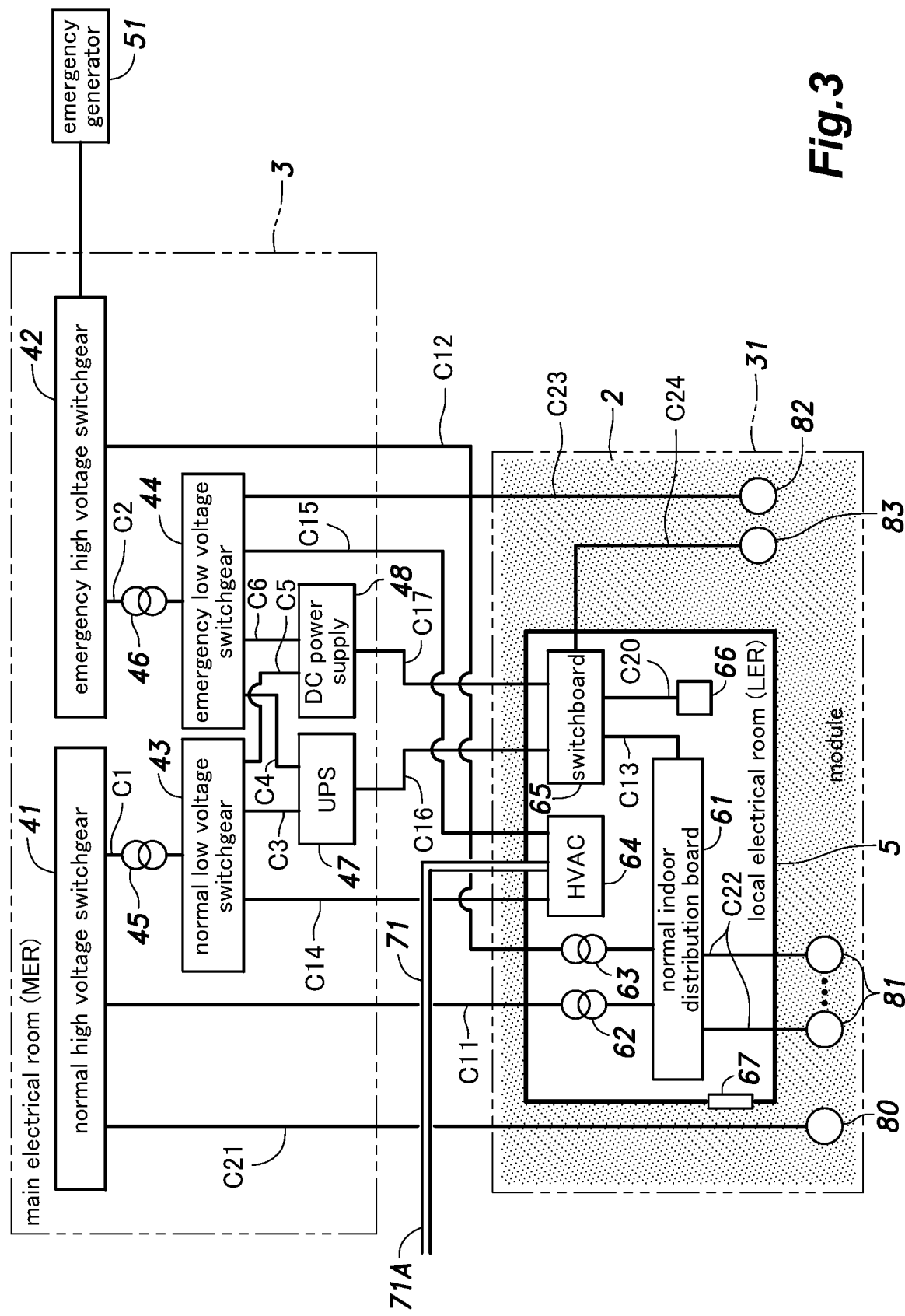
FIG. 3 is an explanatory diagram showing a configuration for supplying power from an MER shown in FIG. 1 to the module.

FIG. 3 is an explanatory diagram showing a configuration for supplying the power from the MER 3 shown in FIG. 1 to the module 2.

The MER 3 includes a normal high voltage switchgear 41, an emergency high voltage switchgear 42, a normal low voltage switchgear 43, an emergency low voltage switchgear 44, a normal transformer 45, an emergency transformer 46, an uninterruptible power supply (hereinafter referred to as "UPS") 47, and a direct current (DC) power supply 48. The MER 3 is located in the non-hazardous area.

Each switchgear 41 to 44 constitutes a normal or emergency distribution board (out-of-area distribution board) configured such that a switch (opening/closing device) for opening and closing an electrical line, a measuring instrument for voltage and current, a control circuit, and the like are accommodated in a metal housing.

The normal high voltage switchgear 41 is configured to receive high voltage AC power as normal power from a power company (not shown) or a normal generator located in the LNG plant 1.

Further, the emergency high voltage switchgear 42 is connected to an emergency generator 51 located in the non-hazardous area near the MER 3, and is configured to receive the AC power from the emergency generator 51. The emergency generator 51 is started in a case where the normal power supplied from the power company, the normal generator, or the like is lost due to occurrence of a power failure or the like. The emergency generator 51 is configured to supply the power to the emergency high voltage switchgear 42. For example, a diesel generator is used as the emergency generator 51.

The normal high voltage switchgear 41 is connected to the normal low voltage switchgear 43 by a power cable C1 via the normal transformer 45. Further, the emergency high voltage switchgear 42 is connected to the emergency low voltage switchgear 44 by a power cable C2 via the emergency transformer 46. Each of the normal transformer 45 and the emergency transformer 46 consists of an oil-filled transformer whose windings are cooled by insulating oil. Incidentally, the normal transformer 45 and the emergency transformer 46 may be provided integrally with the normal high voltage switchgear 41 and the emergency high voltage switchgear 42 respectively.

The high voltage power from the normal high voltage switchgear 41 is supplied to the normal low voltage switchgear 43 as the lower voltage power transformed by the normal transformer 45. Similarly, the high voltage power from the emergency high voltage switchgear 42 is supplied to the emergency low voltage switchgear 44 as the lower voltage power transformed by the emergency transformer 46.

The UPS 47 is an emergency power supply device for continuing to supply the AC power to the module 2 in an emergency. For example, "emergency" means a situation where the power is cut off due to a power failure or the like. The UPS 47 is connected to the normal low voltage switchgear 43 and the emergency low voltage switchgear 44 by the power cable C3 and the power cable C4 respectively. The UPS 47 is configured to receive the power from these switchgears 43, 44.

Further, the DC power supply 48 is an emergency power supply device for continuing to supply DC power to the module 2 in an emergency. Like the UPS 47, the DC power supply 48 is connected to the normal low voltage switchgear 43 and the emergency low voltage switchgear 44 by the power cable C5 and the power cable C6 respectively.

Incidentally, the MER 3 is located in the non-hazardous area. Accordingly, the power devices (each switchgear, each transformer, and the like) accommodated in the MER 3 do not need to have explosion-proof properties.

The LER 5 has a normal indoor distribution board 61, a normal first dry transformer 62, an emergency second dry transformer 63, a Heating, Ventilating, and Air-Conditioning unit (HVAC unit) 64, and a switchboard 65. The indoor distribution board 61, the first and second dry transformers 62, 63, and the switchboard 65 are power devices accommodated in the LER 5. Although the LER 5 is located in the hazardous area 31, devices without explosion-proof properties are used as the indoor distribution board 61, the first dry transformer 62, and the second dry transformer 63.

On the other hand, the HVAC device 64 and the switchboard 65 are devices that may become an ignition source. Accordingly, the HVAC device 64 and the switchboard 65 have explosion-proof properties.

Further, the LER 5 is provided with an indoor environment sensor 66 (hereinafter simply referred to as "sensor 66") and a vent device 67 that enables ventilation between an inside and an outside of the LER 5 by opening and closing an opening provided in a wall defining the inside of the LER 5. For example, the vent device 67 consists of a pressure relief damper. The vent device 67 is configured to control the flow of gas between the inside and the outside of the LER 5 based on the opening/closing degree of the opening. Further, the vent device 67 may include a fan configured to discharge the gas from the LER 5.

Further, the module 2 includes a group of plant equipment 6 (see FIG. 1) outside the LER 5. In the example shown in FIG. 3, a high voltage electrical load 80 and at least a portion of first to third low voltage electrical loads 81 to 83 constitute the group of plant equipment 6.

The indoor distribution board 61 has the same configuration as each switchgear 41 to 44 in the MER 3. The indoor distribution board 61 is configured such that a switch (opening/closing device) for opening and closing an electrical line, a measuring instrument for voltage and current, a control circuit, and the like are accommodated in a metal housing.

The indoor distribution board 61 is connected to the normal high voltage switchgear 41 in the MER 3 by a power cable C11 via the first dry transformer 62. Accordingly, the high voltage power from the normal high voltage switchgear 41 is supplied to the indoor distribution board 61 as the low voltage power transformed by the first dry transformer 62.

Further, the indoor distribution board 61 is connected to the emergency high voltage switchgear 42 in the MER 3 by a power cable C12 via the second dry transformer 63. Accordingly, the high voltage power from the emergency high voltage switchgear 42 is supplied to the indoor distribution board 61 as the low voltage power transformed by the second dry transformer 63.

Further, the indoor distribution board 61 is connected to the switchboard 65 by a power cable C13. For example, the indoor distribution board 61 is configured to receive the DC power for a switch from the switchboard 65 in an emergency.

The HVAC device 64 is an example of an outside air supply device, and is an explosion-proof device configured to cool, heat, ventilate, and air-condition the inside of the LER 5. An air intake pipe 71 for introducing outside air into the LER 5 is connected to the HVAC device 64. An outside air inlet 71A as an upstream end of the air intake pipe 71 is located in the non-hazardous area. Accordingly, the combustible gas is prevented from mixing with the outside air supplied to the LER 5 by the HVAC device 64.

Incidentally, in a case where the non-hazardous area is present in an area inside the module 2, the upstream end 71A of the air intake pipe 71 may be located in the non-hazardous area inside the module 2.

The HVAC device 64 is configured to continuously supply the outside air to the inside of the LER 5 so as to set the inside of the LER 5 at positive pressure. When the outside air is supplied by the HVAC device 64, the vent device 67 controls the flow of gas between the inside and the outside of the LER 5 based on the opening/closing degree of the opening.

Incidentally, the inside of the LER 5 does not need to be completely sealed. For example, the LER 5 may have a gap (for example, a slight gap between a door of a doorway and an opening of a door frame) through which the gas inside the LER 5 (the gas whose amount corresponds to the outside air supplied by the HVAC device 64) can be discharged to the outside on condition that the inside of the LER 5 can be kept at positive pressure.

The HVAC device 64 is connected to the normal low voltage switchgear 43 and the emergency low voltage switchgear 44 in the MER 3 by a power cable C14 and a power cable C15 respectively. Accordingly, the HVAC device 64 is ordinarily supplied with low voltage AC power from the normal low voltage switchgear 43. On the other hand, in an emergency, the HVAC device 64 is supplied with the low voltage AC power from the emergency low voltage switchgear 44. The power is supplied to the HVAC device 64 by the power cables C14 and C15 without passing through the power devices in the LER 5.

Incidentally, the LER 5 may be provided with another device, which at least has the above function of introducing the outside air into the LER 5, in addition to or instead of the HVAC device 64.

The switchboard 65 includes a circuit breaker for a current leakage, a circuit breaker for wiring, and the like. The switchboard 65 can distribute the AC power and the DC power. The switchboard 65 is connected to the UPS 47 and the DC power supply 48 in the MER 3 by a power cable C16 and a power cable C17 respectively. Accordingly, in an emergency, the AC power and the DC power (control electric power) are supplied from the UPS 47 and the DC power supply 48 to the switchboard 65 respectively.

The sensor 66 consists of, for example, a gas detection sensor configured to detect the combustible gas present in the LER 5, a pressure sensor configured to measure the pressure in the LER 5, and a temperature sensor configured to measure the temperature in the LER 5. The sensor 66 is connected to the switchboard 65 by a power cable C20. Further, although not shown, the sensor 66 is connected to the indoor distribution board 61 in the LER 5 by a power cable. Accordingly, the low voltage AC power is ordinarily supplied to the sensor 66 from the indoor distribution board 61. On the other hand, in an emergency, the sensor 66 is supplied with the low voltage AC power from the switchboard 65.

The high voltage electrical load 80 consists of, for example, a motor used for a large-capacity compressor or the like. The high voltage electrical load 80 is connected to the normal high voltage switchgear 41 in the MER 3 by a power cable C21. Accordingly, the high voltage power is supplied from the normal high voltage switchgear 41 to the high voltage electrical load 80 without passing through the power devices accommodated in the LER 5.

The first low voltage electrical loads 81 include, for example, a motor used for a pump configured to transport the LNG or the refrigerant. The first low voltage electrical loads 81 are connected to the indoor distribution board 61 in the LER 5 by power cables C22. Accordingly, the low voltage power is ordinarily supplied from the indoor distribution board 61 to the first low voltage electrical loads 81. On the other hand, in an emergency, the power supply to the first low voltage electrical loads 81 is stopped.

The second low voltage electrical load 82 consists of, for example, a motor used for a pump configured to supply lubricating oil to the high voltage electrical load 80. The second low voltage electrical load 82 is connected to the emergency low voltage switchgear 44 in the MER 3 by a power cable C23. Further, although not shown, the normal high voltage switchgear 41 and the emergency high voltage switchgear 42 are configured to receive high voltage AC power as the normal power. Accordingly, the AC power, which is transformed to low voltage by the emergency low voltage switchgear 44 in the MER 3, is supplied from the emergency high voltage switchgear 42 to the second low voltage electrical load 82 at a normal time and in an emergency.

Incidentally, in an emergency, the power supply from the emergency low voltage switchgear 44 takes time to recover (for example, to start the emergency generator 51 after the occurrence of a power failure). Accordingly, a device that does not cause major problems for the module 2 and the LNG plant 1 due to such a temporary failure of the power supply is used as the second low voltage electrical load 82.

The third low voltage electrical load 83 is a device used for telecommunications or the like in the LNG plant 1. For example, the third low voltage electrical load 83 consists of a network device, a telephone, a speaker, and the like. The third low voltage electrical load 83 is connected to the switchboard 65 by a power cable C24. At a normal time and in an emergency, the low voltage AC power is supplied from the switchboard 65 to the third low voltage electrical load 83.

The switchboard 65 can distribute the power even in an emergency. Accordingly, if it is not preferable to stop supplying the power to a device, this device is used as the third low voltage electrical load 83.

Incidentally, in FIG. 3, the primary power cables 11 (FIG. 1) connecting the MER 3 and the LER 5 are the power cables C11, C12, and C14 to C17. Further, the secondary power cables 12 (FIG. 1) are the power cables C20, C22, and C24.

Figure 4:
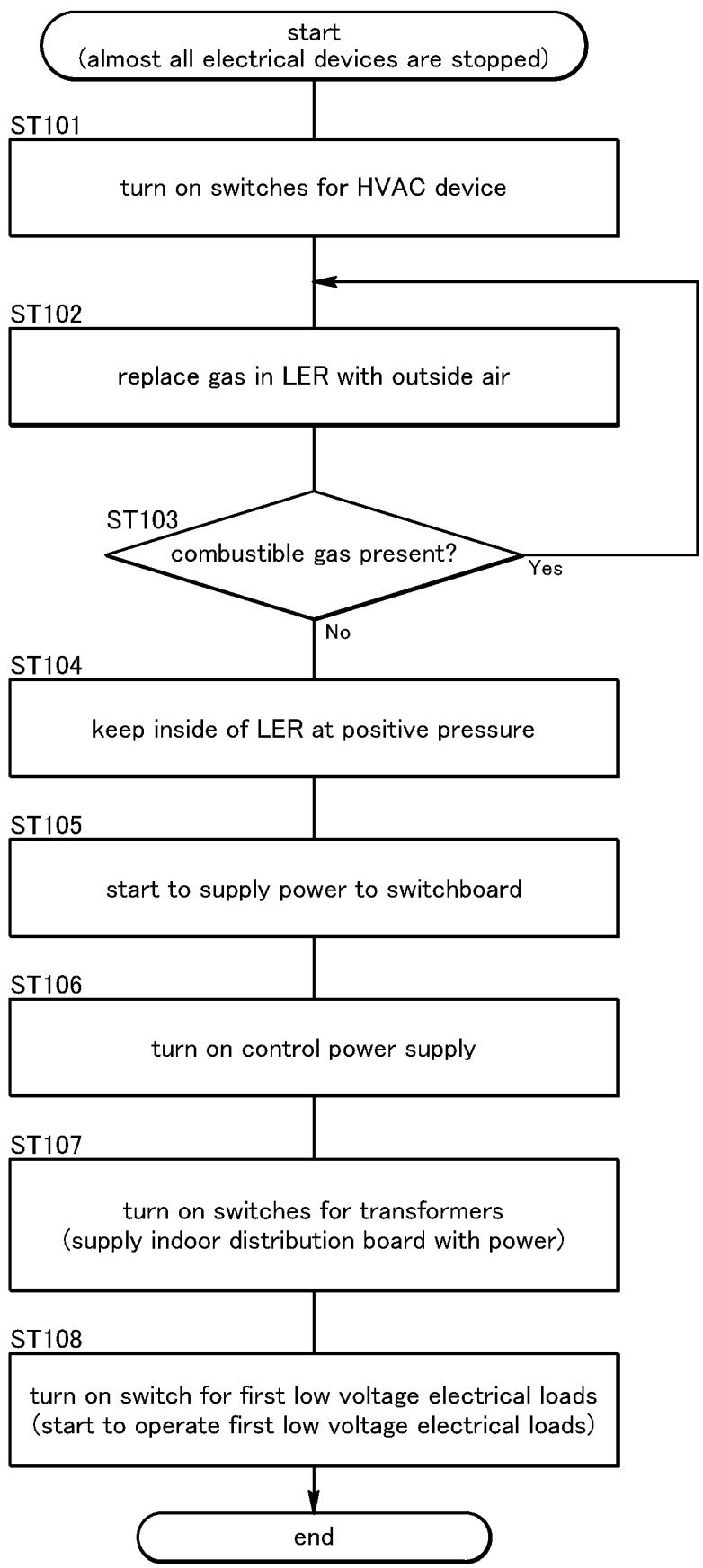
FIG. 4 is a flowchart showing a procedure at the time of starting a local electrical room.

FIG. 4 is a flowchart showing a procedure at the time of starting the LER 5.

In the LNG plant 1, almost all the electrical devices in the LER 5 are stopped at the start of operation or in an emergency such as a power failure. Accordingly, as shown in FIG. 4, an operator or a controller starts or restarts the LER 5 while considering the possibility that the combustible gas is present in the LER 5.

First, in the normal low voltage switchgear 43 and the emergency low voltage switchgear 44 in the MER 3, the switch for distributing the power to the HVAC device 64 is turned on (ST101). Accordingly, the HVAC device 64 supplied with the power starts to operate and the outside air is supplied from the air intake pipe 71, and thus the LER 5 is ventilated and the gas inside the LER 5 is replaced with the outside air (ST102).

Subsequently, based on the detection result of the sensor 66, whether the combustible gas is present in the LER 5 is determined (ST103). At this time, in a case where the combustible gas is detected in the LER 5 (ST103: Yes), the ventilation of the LER 5 by the HVAC device 64 is continued (ST102). On the other hand, in a case where the combustible gas is not detected in the LER 5 (ST103: No), the HVAC device 64 sets the inside of the LER 5 at positive pressure (ST104).

After that, the UPS 47 and the DC power supply 48 in the MER 3 start to supply the power to the switchboard 65 in the LER 5 (ST105). Incidentally, in a case where the LER 5 is started in an emergency such as a power failure, the UPS 47 and the DC power supply 48 start to supply the power to the switchboard 65 in the LER 5 when the power failure or the like occurs.

Next, a control power supply of the indoor distribution board 61 in the LER 5 is turned on (ST106). Subsequently, in the normal high voltage switchgear 41 and the emergency high voltage switchgear 42 in the MER 3, the switch for distributing the power to the first dry transformer 62 in the LER 5 and the switch for distributing the power to the second dry transformer 63 in the LER 5 are turned on respectively (ST107). Accordingly, the indoor distribution board 61 in the LER 5 is supplied with the power from at least one of the normal high voltage switchgear 41 and the emergency high voltage switchgear 42 in the MER 3.

Next, in the indoor distribution board 61 in the LER 5, a switch for distributing the power to the first low voltage electrical loads 81 is turned on (ST108). Accordingly, the power is supplied to the first low voltage electrical loads 81, and thus the first low voltage electrical loads 81 start to operate.

Incidentally, a series of steps described above may be at least partially performed by the operator of the LNG plant 1. Alternatively, a series of steps described above may be at least partially performed by a controller located in the MER 3 or the like.

The Second Embodiment

Figure 5:
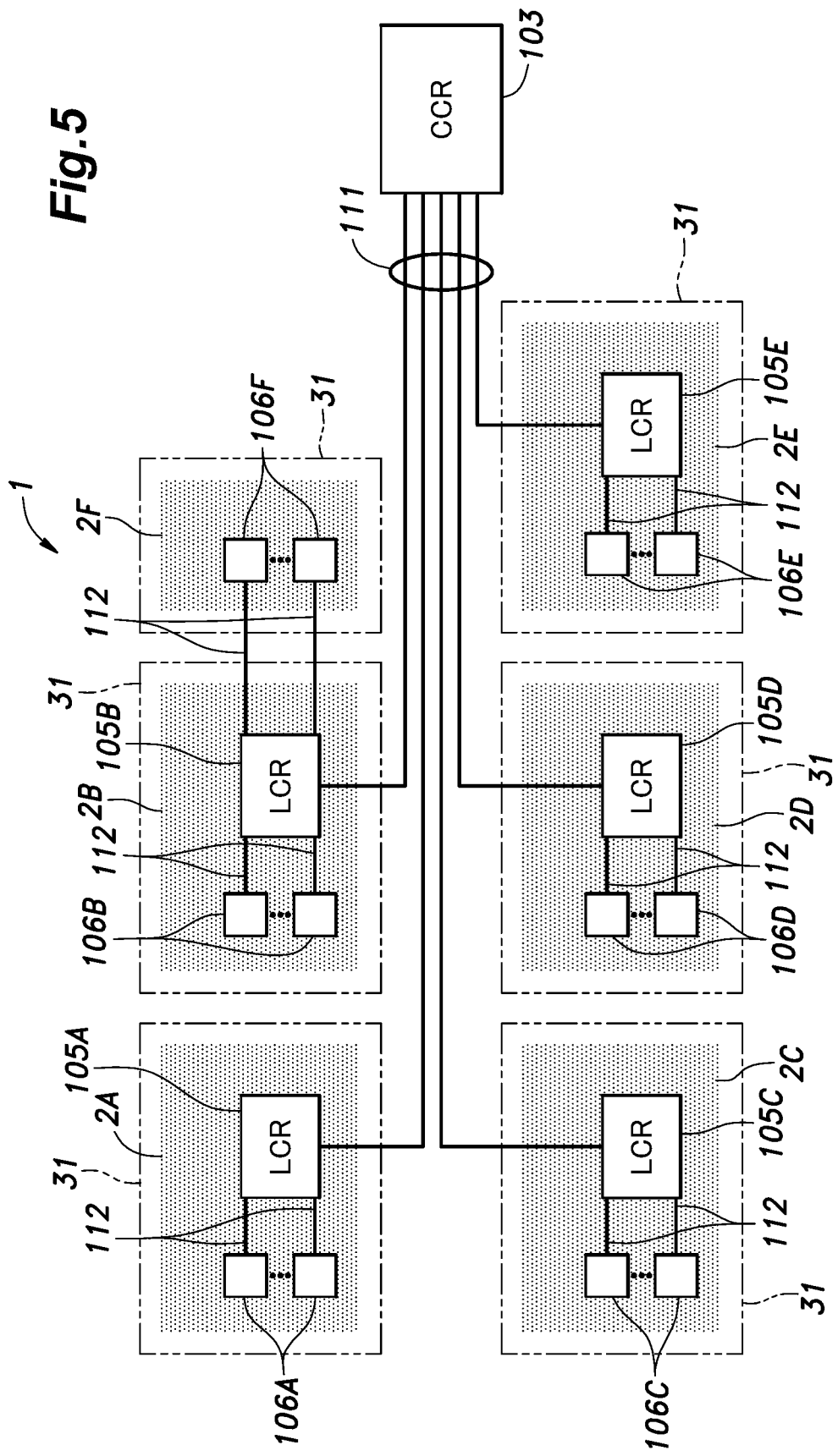
FIG. 5 is an overall block diagram showing an outline of an LNG plant according to the second embodiment.

FIG. 5 is an overall block diagram showing an outline of an LNG plant 1 according to the second embodiment. In FIG. 5, the same components as those of the above-mentioned first embodiment are designated by the same reference numerals. Further, relating to the LNG plant 1 according to the second embodiment, the matters that are not specifically mentioned below are the same as those of the LNG plant 1 according to the first embodiment.

As shown in FIG. 5, a central control room 103 (hereinafter referred to as "CCR"), which has a primary control device for transmitting control signals to each module 2, is provided in the LNG plant 1. Further, each module 2A-2E is provided with a local control room (hereinafter referred to as "LCR") 105A-105E that has an auxiliary control device. The auxiliary control device is configured to transmit/receive control signals to/from the primary control device in the CCR 103 via each primary signal cable 111. Further, the auxiliary control device of each LCR 105A-105E is configured to transmit/receive signals to/from a group of plant equipment 106A-106E via each secondary signal cable 112 based on the transmission/reception of the control signals to/from the primary control device in the CCR 103. The group of plant equipment 106A-106E consists of a plurality of controlled devices that constitute each module 2A-2E in which the auxiliary control device is located.

On the other hand, the module 2F is not provided with a LCR. However, the group of plant equipment 106F is configured to transmit/receive the control signals to/from the auxiliary control device in the LCR 105B of the module 2B adjacent to the module 2F. That is, in the LNG plant 1, a control device of the LCR provided in one module is configured to transmit/receive the control signals to/from the group of plant equipment of a module adjacent to the one module in a case where the LCR is not provided in the module adjacent to the one module or for the convenience of wiring of the secondary signal cable or the like in a case where the LCR is provided in the module adjacent to the one module.

Incidentally, at least a portion of each secondary signal cable 112 is installed in advance when each module 2A-2F is assembled in a remote place. Further, as each secondary signal cable 112, a cable having a diameter smaller than that of each primary signal cable 111 is used. Accordingly, in the LNG plant 1, the cost of the signal cables can be reduced.

Although not shown in FIG. 5, the above-mentioned LER 5 shown in FIG. 1 may be provided in the LNG plant 1 according to the second embodiment.

In the following, in a case where it is not necessary to distinguish each LCR 105A-105E, each LCR 105A-105E will be collectively referred to as "LCR 105". Further, in a case where it is not necessary to distinguish each group of plant equipment 106A-106F, each group of plant equipment 106A-106F will be collectively referred to as "group of plant equipment 106".

Figure 6:
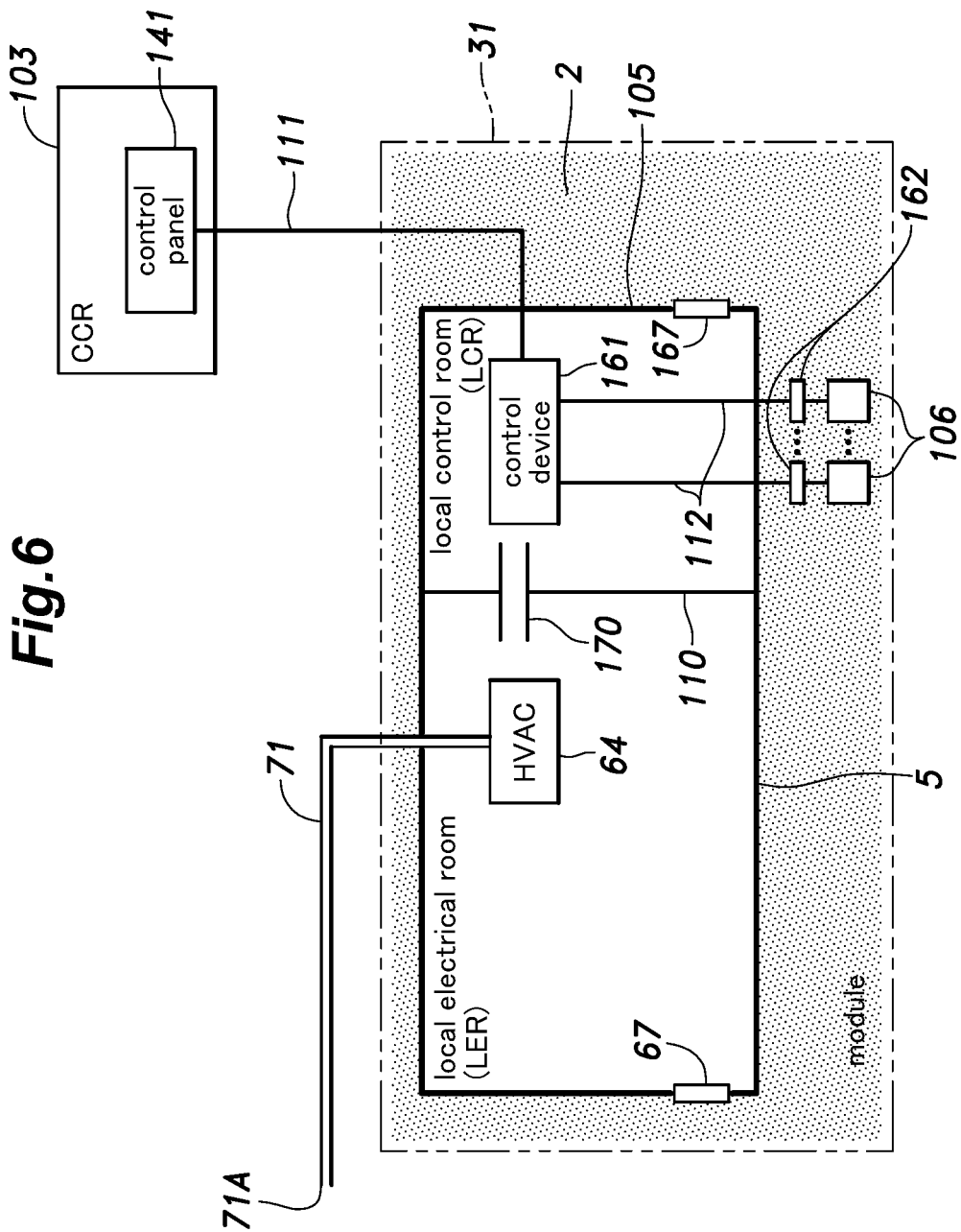
FIG. 6 is an explanatory diagram showing a configuration for transmission between a CCR shown in FIG. 5 and a LCR.

FIG. 6 is an explanatory diagram showing a configuration for transmission between the CCR 103 shown in FIG. 5 and the LCR 105.

The CCR 103 has a control panel 141 as a control device. The control panel 141 is configured to comprehensively control a control target included in the group of plant equipment 106 of the LNG plant 1 based on an operation by an operator.

Each module 2 includes an LER 5 that has the electrical device and a LCR 105 that has the control device. In the present embodiment, the LER 5 and the LCR 105 share an upper wall, a side wall, and a bottom wall of one building, and the inside of the LER 5 and the inside of the LCR 105 are separated from each other by a partition 110. Although the MER 3 and some components in the LER 5 are omitted in FIG. 6, their configurations are the same as those shown in FIG. 3.

The group of plant equipment 106 includes various sensors, a solenoid valve, a control valve, or the like as the controlled devices.

The LCR 105 has a control device 161 including a controller, an I/O module, and the like. Although the LCR 105 is located in the hazardous area 31, the control device 161 does not have explosion-proof properties.

The control device 161 is connected to each controlled device (the group of plant equipment 106) via each junction box 162 by each secondary signal cable 112. In the present embodiment, each junction box 162 and the group of plant equipment 106 are located outside the LCR 105.

The inside of the LCR 105 communicates with the inside of the LER 5 via a duct 170 penetrating through the partition 110. Further, a vent device 167 is provided on a side wall of the LCR 105. The vent device 167 has the same function as the vent device 67 of the LER 5. For example, the vent device 167 consists of a pressure relief damper.

According to such a configuration, the outside air, which is supplied to the LER 5 by the HVAC device 64, is supplied to the LCR 105 via the duct 170. Accordingly, the inside of the LCR 105 is ordinarily kept at positive pressure. When the outside air is supplied to the LER 5 by the HVAC device 64, the vent device 167 can control the flow of gas between the inside and the outside of the LCR 105 (namely, the amount of gas emitted from the LCR 105) based on the opening/closing degree of the opening.

Further, at the start of operation or in an emergency such as a power failure, the gas inside the LCR 105 can be replaced with the outside air in the same procedure as the procedure shown in FIG. 4.

Incidentally, the above-mentioned HVAC device 64 may be independently located in the LCR 105. In such a case, the duct 170 that penetrates through the partition 110 is not necessary. Further, in the present embodiment, the LCR 105 is arranged together with the LER 5, for example. However, the LCR 105 and the LER 5 may be arranged separately. In such a case, the LCR 105 may be provided with a device (outside air supply device) configured to receive the power from the switchgear (distribution board) in the non-hazardous area, like the abovementioned HVAC device 64.

The present invention has been described above based on specific embodiments, but these embodiments are merely examples, and the present invention is not limited to these embodiments. Not all of the components of the plant module, the plant including the same, and the operation method of the plant according to the present invention shown in the above embodiments are indispensable, and at least those skilled in the art can appropriately select the components within the scope of the present invention.

In a case where the combustible gas is heavier than air, the LER 5 may be composed of a side wall and a bottom wall while an upper wall thereof is omitted. In such a case, the side wall is formed in a cylindrical shape without an entrance/exit for the operator. Further, the side wall can be made of concrete. In such a case, the inside of the LER 5 is not a closed space, but can prevent the entrance of the combustible gas, which is heavier than air. Accordingly, in the LER 5, the HVAC device 64 can be omitted. Incidentally, the operator can enter and exit the LER 5 from an opening above the side wall via a staircase or the like.

Further, in the LER 5, a known explosion-proof switch rack can be used instead of the indoor distribution board 61 shown in FIG. 3. Accordingly, in the LER 5, the HVAC device 64 can be omitted.

GLOSSARY OF TERMS

1: LNG plant
2: module
3: MER (main electrical room)
5: LER (local electrical room)
6: a group of plant equipment
11: primary power cable
12: secondary power cable
21: structure
31: hazardous area
41: normal high voltage switchgear (normal distribution board)
42: emergency high voltage switchgear (emergency distribution board)
43: normal low voltage switchgear (out-of-area distribution board and normal distribution board)
44: emergency low voltage switchgear (out-of-area distribution board and emergency distribution board)
45: normal transformer
46: emergency transformer
47: UPS (uninterruptible power supply)
48: DC power supply
51: emergency generator
61: indoor distribution board (power device)
62: first dry transformer
63: second dry transformer
64: HVAC device (outside air supply device)
65: switchboard
66: indoor environment sensor
67: vent device
71: air intake pipe
71A: outside air inlet
80: high voltage electrical load
81: first low voltage electrical load 82: second low voltage electrical load
83: third low voltage electrical load
103: CCR (central control room)
105: LCR (local control room)
106: a group of plant equipment
110: partition
111: primary signal cable
112: secondary signal cable
141: control panel
161: control device
162: junction box
167: vent device
170: duct
C14: power cable
C15: power cable

The invention claimed is:

1. An operation method of a plant including a plant module,
the plant module comprising:
a group of plant equipment that constitutes the plant;
a local control room located in a hazardous area defined by presence of combustible gas, the local control room having a control device configured to transmit a control signal to the group of plant equipment;
a structure supporting the group of plant equipment and the local control room; and
an outside air supply device having explosion-proof properties and configured to supply outside air to an inside of the local control room,
the operation method of the plant comprising
supplying electric power to the outside air supply device from a non-hazardous area.

2. An operation method of a plant including a plant module,
the plant module comprising:
a group of plant equipment that constitutes the plant;
a local electrical room located in a hazardous area defined by presence of combustible gas, the local electrical room having a power device configured to supply electric power to the group of plant equipment;
a structure supporting the group of plant equipment and the local electrical room; and
an outside air supply device having explosion-proof properties and arranged at the local electrical room to supply outside air to an inside thereof,
the operation method of the plant comprising:
supplying the electric power to the outside air supply device from a non-hazardous area,
after starting to supply the electric power to the outside air supply device, replacing gas inside the local electrical room with the outside air by the outside air supply device; and
starting to supply the electric power to at least one device included in the group of plant equipment.

3. A plant module, comprising:
a group of plant equipment that constitutes a plant;
a local control room located in a hazardous area defined by presence of combustible gas, the local control room having a control device configured to transmit a control signal to the group of plant equipment;
a structure supporting the group of plant equipment and the local control room;
an outside air supply device having explosion-proof properties and arranged at the local control room to supply outside air to an inside thereof; and
a power cable configured to supply electric power to the outside air supply device from a non-hazardous area.

4. A plant, comprising a plant module,
wherein the plant module includes:
a group of plant equipment that constitutes the plant;
a local electrical room located in a hazardous area defined by presence of combustible gas, the local electrical room having a power device configured to supply electric power to the group of plant equipment;
a structure supporting the group of plant equipment and the local electrical room;
an outside air supply device having explosion-proof properties and arranged at the local electrical room to supply outside air to an inside thereof;
two power cables configured to supply the electric power to the outside air supply device from a non-hazardous area; and
a main electrical room located outside the hazardous area and having one or more out-of-area distribution boards configured to supply the electric power to the local electrical room,
wherein the two power cables connect the one or more out-of-area distribution boards and the outside air supply device, and
the one or more out-of-area distribution boards include a normal distribution board configured to distribute the electric power from a normal power supply, and an emergency distribution board configured to distribute the electric power from an emergency power supply.

5. The plant according to claim 4, further comprising:
a switchboard located in the local electrical room;
an indoor distribution board located in the local electrical room and configured to supply the electric power to the group of plant equipment; and
a power supply device located in the main electrical room and configured to supply control electric power to the switchboard,
wherein the switchboard is configured to supply the control electric power supplied from the power supply device to the indoor distribution board.

6. The plant according to claim 4, wherein each of the normal distribution board and the emergency distribution board includes a high voltage switchgear and a low voltage switchgear, and
the plant module further includes:
a first dry transformer located in the local electrical room and configured to transform high voltage power to low voltage power, the high voltage power transformed by the first dry transformer being supplied from the high voltage switchgear of the normal distribution board to the power device, and
a second dry transformer located in the local electrical room and configured to transform high voltage power to low voltage power, the high voltage power transformed by the second dry transformer being supplied from the high voltage switchgear of the emergency distribution board to the power device.

7. The plant according to claim 6, wherein a first one of the two power cables is connected to the low voltage switchgear of the normal distribution board, and a second one of the two power cables is connected to the low voltage switchgear of the emergency distribution board.

8. The plant according to claim 6, wherein the plant module further includes a high voltage electrical load to which the high voltage power from the high voltage switchgear as the normal distribution board is supplied without passing through the power device.

9. The plant according to claim 4, further comprising a generator connected to the emergency distribution board.

10. The plant according to claim 4, further comprising a local control room having a control device configured to transmit a control signal to the group of plant equipment.

\* \* \* \* \*